United States Patent [19]

Flecher et al.

[11] 4,339,680
[45] Jul. 13, 1982

[54] SORPTION PUMP FOR A TURBOGENERATOR ROTOR WITH SUPERCONDUCTIVE EXCITATION WINDING

[75] Inventors: Pierre Flecher, Alzenau-Mischelbach, Fed. Rep. of Germany; Hansjörg Köfler, Graz, Austria

[73] Assignee: BBC Brown, Boveri & Company, Ltd., Baden, Switzerland

[21] Appl. No.: 209,741

[22] Filed: Nov. 24, 1980

Related U.S. Application Data

[63] Continuation of Ser. No. 966,568, Dec. 5, 1978, abandoned.

[30] Foreign Application Priority Data

Jan. 24, 1978 [CH] Switzerland ............................ 721/78

[51] Int. Cl.$^3$ .............................................. H02K 9/00
[52] U.S. Cl. ........................................ 310/62; 310/53; 310/61; 310/63; 310/64; 62/55.5
[58] Field of Search ................ 310/10, 40, 50, 53, 310/58, 59, 62, 63, 64, 165, 65; 174/14 R, 15 R; 417/55.5, 505; 290/5, 6; 336/DIG. 1

[56] References Cited

U.S. PATENT DOCUMENTS

| | | | |
|---|---|---|---|
| 3,390,536 | 7/1968 | Kreisman | 62/55.5 |
| 3,490,247 | 1/1970 | Wing | 62/55.5 |
| 3,644,766 | 2/1972 | Hughes | 310/165 |
| 3,679,920 | 7/1972 | MacNab | 310/10 |
| 4,120,169 | 10/1978 | Eckels | 417/901 |
| 4,123,676 | 10/1978 | Cooper | 310/52 |
| 4,274,022 | 6/1981 | Elsel | 310/62 |

FOREIGN PATENT DOCUMENTS

| | | | |
|---|---|---|---|
| 1456402 | 11/1976 | United Kingdom | 62/55.5 |
| 642505 | 1/1979 | U.S.S.R. | 62/55.5 |

OTHER PUBLICATIONS

"Lueger Lexicon der Technik", p. 460; Deutsche Verlags-Anstalt Stuttgart, Germany, 1970.
"Turbogeneratoren mit Supraleitender Erregerwicklung", Bull. ASE 64, 1973; pp. 1040-1051.

*Primary Examiner*—R. Skudy
*Attorney, Agent, or Firm*—Burns, Doane, Swecker & Mathis

[57] ABSTRACT

Apparatus to maintain a thermally insulating vacuum in a rotor of a turbogenerator with a superconductive excitation winding is disclosed. A sorption pump is mounted within the rotor in close proximity to the superconductive winding. The cooling system for the superconductive winding also serves to cool the sorption pump. The pump includes an arrangement for protecting the adsorbent material from radiation. The radiation protection is in the form of offset openings in the pump housing to form a labyrinth. Chambers are provided in the pump for the adsorbent material. These chambers are separated by walls or screens to retain the adsorption material in place as the rotor turns. The sorption pump is provided with a heating device in order to regenerate the adsorbent material.

9 Claims, 4 Drawing Figures

SORPTION PUMP FOR A TURBOGENERATOR ROTOR WITH SUPERCONDUCTIVE EXCITATION WINDING

This application is a continuation of application Ser. No. 966,568, filed Dec. 5, 1978, now abandoned.

BACKGROUND OF THE INVENTION

This invention relates to a superconductive excitation winding for the rotor of a turbogenerator, and more particularly to apparatus for maintaining a thermally insulating vacuum in the rotor.

A turbogenerator with a superconductive excitation winding and with rotating cryostats is described in an article "Turbogenerators with superconducting field coils" Bull. ASE 64 (1973) of August 17, 18, pages 1040 and following. At page 1043 of this publication, a turbogenerator is illustrated and described in which the excitation winding is cooled by liquid helium. The inner rotor which carries the excitation winding is arranged inside an outer cylinder. A high vacuum is produced in the space between the cylinders. The mounting of the inner rotor and the transfer of the torque to the shaft ends, which are at room temperature, is accomplished by thin wall portions which are cooled also with helium gas. A thin radiation cylinder is mounted in the space between the inner rotor and the outer cylinder to serve as an additional electro-thermal shield. The radiation cylinder also absorbs the heat radiated by the outer cylinder and reduces any remaining magnetic fields which penetrate the outer attenuating cylinder to a value that can be tolerated by the superconductor.

At the non-driven side of the shaft, there is provided a helium transfer unit with slip rings and lines supplying the excitation current which are cooled within the shaft by helium gas. In order to maintain the insulating vacuum, an external pump system is connected with the vacuum chambers of the rotor by means of rotating vacuum seals which must be designed and manufactured to close tolerances. However, these seals are subject to failure due to wear and tear. The external pump system has a high energy consumption due to its relatively low efficiency and is also subject to malfunction.

It is an object of this invention to overcome the deficiencies of prior apparatus for maintaining a thermally insulating vacuum in a rotor of a turbogenerator with a superconductive exciting winding and to provide apparatus which is simple in design, reliable in operation and efficient.

SUMMARY OF THE INVENTION

In accordance with this invention, there is provided in the rotor of the turbogenerator at least one sorption pump which communicates directly with the vacuum chambers of the rotor by means of connecting apertures.

DETAILED DESCRIPTION OF THE DRAWINGS

This invention is illustrated in accordance with a preferred embodiment by the drawings, in which.

DESCRIPTION OF PREFERRED EMBODIMENT

Figure 1:
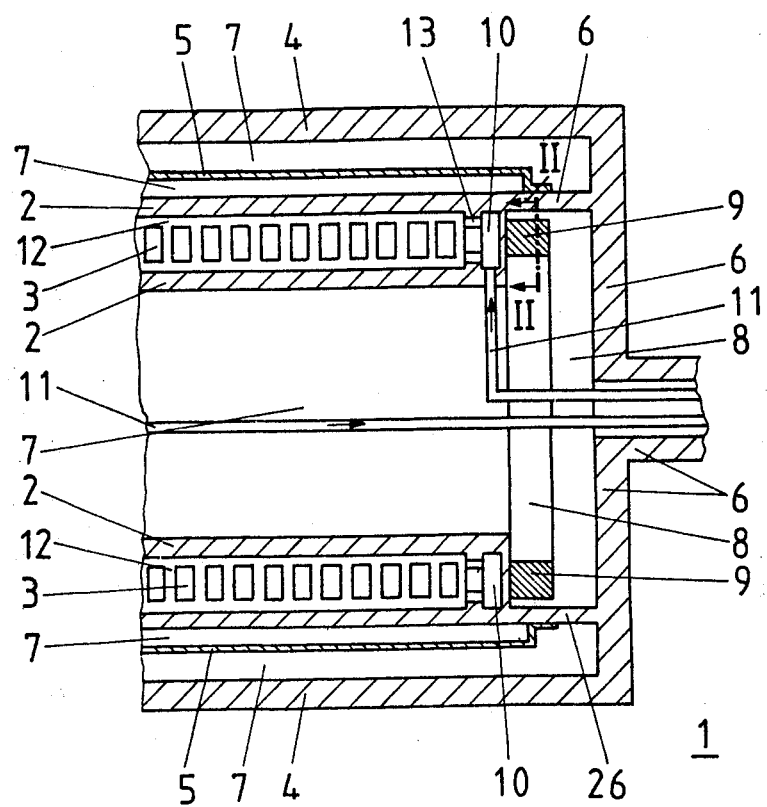
FIG. 1 is a longitudinal view of the undriven side of a turbogenerator rotor with a superconductive excitation winding.

Referring to FIG. 1, the rotor 1 of a turbogenerator has an inner rotor 2 in which is mounted a superconductive winding 3. The inner rotor 2 is housed within an outer cylinder 4. A thin radiation cylinder 5 is secured on the inner rotor 2 between the inner rotor and the outer cylinder 4. A shaft 6 is connected with the inner rotor 2 and the outer cylinder 4 by means of a transition piece 26. Vacuum chambers 7 are provided between the inner rotor 2 and the radiation cylinder 5; between the radiation cylinder 5 and the outer cylinder 4; and in the interior of the rotor 2. In the interior of the transition piece 26 between the inner rotor 2 and the shaft 6, a vacuum chamber 8 is provided. A sorption pump 9 is mounted within the vacuum chamber 8. FIG. 1 shows this sorption pump only in a simplified manner in the form of a ring with a rectangular cross section. A cooling device 10 of the sorption pump 9 is connected to a helium conducting pipe 11. The liquid helium flows from the cooling device 10 through connecting ducts 13 into cooling ducts 12 of the superconductive winding 3.

The sorption pumps that are suitable are known, see for example Lueger, Volume 16 "Lexikon der Verfahrenstechnik", Stuttgart 1970, page 460. These pumps are in the form of a sealed metallic vessel which is vacuum proof. The vessel can be heated and cooled and is filled with a granular adsorbent such as zeolite or activated charcoal.

Figure 2:
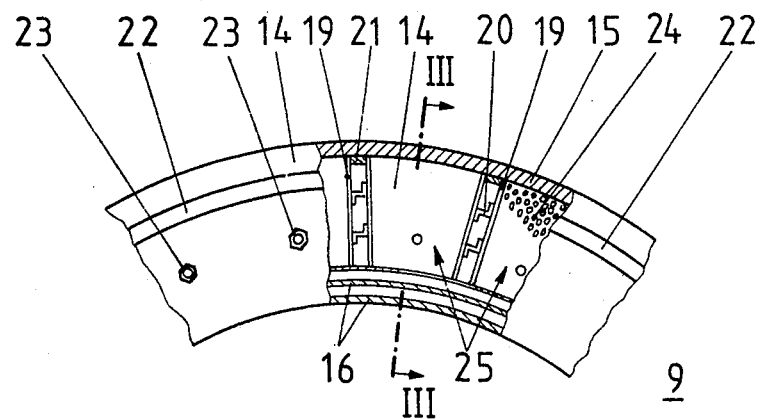
FIG. 2 is cross-sectional view of the sorption pump along the line II—II in FIG. 1.

As shown in FIGS. 1-4, the sorption pump is in the form of a ring. The ring is formed by a pair of flanges 14 which are spaced apart by a spacer tube 15. Two radiation protection tubes 16 are placed between the inner faces of the flanges 14. A cylindrical screen 18 is arranged coaxially with the radiation protection tubes 16. Between the spacer tube 15 and the cylindrical screen 18 there are fastened flat screens 19 which are aligned in a substantially radial direction. The interior of the pump 9 formed by the flanges 14, the cylindrical screen 18 and the spacer tube 15 is divided into chambers 25 by the flat screens 19. The chambers 25 are filled with an adsorbent material such as zeolite. Only one chamber is shown to be filled with the adsorbent material 24, but all of the chambers are actually filled. As shown in FIG. 2, bolts 23 hold the flanges 14 together and clamp the cylindrical members 15, 16, 17 and 18 in place.

The sorption pump 9 includes a pair of circular heating units 22 which are mounted on the exterior of the flanges 14. The heating device 22 is preferably an electrical resistance heater which allows the heating of the adsorbent to a temperature of, for example, 50 K. for the purpose of regeneration of the adsorbent material.

Figures 3, 4:
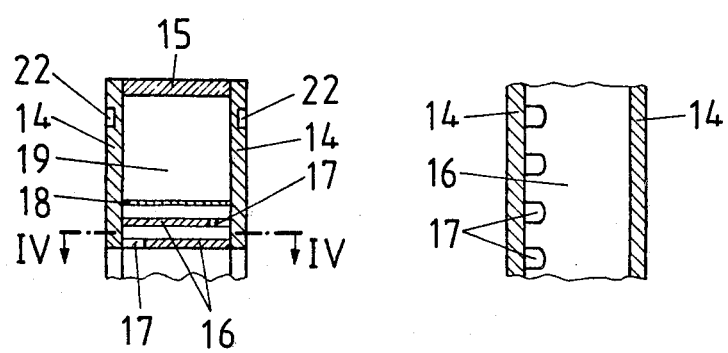
FIG. 3 is a cross-sectional view of the sorption pump along the line III—III in FIG. 2.
FIG. 4 is a cross-sectional view of the sorption pump along the line IV—IV in FIG. 3.

The operation of the sorption pump is entirely physical and its operation will continue as long as the generator is operative, or at least as long as the temperature of the sorption pump is below 20 K. Protection from radiation is obtained by placing recesses 17 in the radiation protection tubes 16 in offset relation as shown in FIG. 3. In this manner the openings 17 are arranged in a labyrinth. This form of radiation protection is very simple in design and results in an optimum connection between the vacuum chambers. Since the sorption pump is circular in shape, it is possible to place the pump inside the rotor without making significant changes in the existing rotor construction. Presently used types of generators with superconductive excitation winding have cylindrical or conical vacuum areas in the transition piece between the rotor body and the shaft ends in order to provide insulation.

As an alternative, it is possible to use a cylindrical sorption pump in place of the circular pump. It is also possible to use two sorption pumps, with one placed at each end of the rotor, or to use only one pump placed at the driving side of rotor. If the sorption pump is positioned between the cold section of the rotor and the hot shaft, it will be advantageous to provide the sorption pump with a cooling system of liquid helium. This cooling system of the sorption pump can either be incorporated in the circulating system of the liquid helium, comprising the cooling ducts of the superconductive winding, or a portion of the helium supply can be tapped. As another modification, the sorption pump may be placed in direct heat conducting contact with a section of the rotor that is at a low temperature. A suitable radiation protector should be provided for the sorption pump. The cooling device of the sorption pump can also be arranged at both sides and/or cool the sorption pump at its outer or inner surface. Obviously, in the latter case it would be necessary to replace the coaxial screen and radiation protection tubes located at the pump inside by analogous circularly shaped plates arranged axially side by side at one flank of the pump.

While this invention has been illustrated and described in a preferred embodiment with several modifications, it is recognized that various other modifications can be made without departing from the invention as defined in the claims.

What is claimed is:

1. Apparatus for maintaining a thermally insulating vacuum in a turbogenerator rotor having a superconductive excitation winding, said apparatus comprising a sorption pump in the interior of said rotor, said rotor having at least one vacuum chamber, said sorption pump having apertures communicating with said vacuum chamber, said sorption pump having a plurality of separate material chambers containing an adsorbent material and the walls of said material chambers being at least partially formed by screens, whereby said sorption pump adsorbs matter from said vacuum chamber, thereby maintaining the vacuum in the vacuum chamber.

2. The apparatus as defined in claim 1 including cooling means for said sorption pump.

3. The apparatus as defined in claim 2 wherein said cooling means includes means for conducting liquid helium in heat exchange relation with said sorption pump.

4. The apparatus as defined in claim 1 wherein said sorption pump is in direct heat exchange relation with the portion of said rotor which is maintained at a low temperature.

5. The apparatus as defined in claim 1 wherein said sorption pump has means for protecting the interior of said pump from radiation.

6. The apparatus as defined in claim 5 wherein said means for radiation protection includes coaxial radiation protection members having recesses arranged in offsetting relation to form a labyrinth.

7. The apparatus as defined in claim 1 wherein said sorption pump includes means for heating adsorption material contained within said pump.

8. The apparatus as defined in claim 7 wherein said heating means includes at least one electrical resistance heating unit.

9. Apparatus according to claim 1 wherein the sorption pump is in the form of a ring mounted within said rotor.

* * * * *